(12) United States Patent
Park et al.

(10) Patent No.: US 10,501,622 B2
(45) Date of Patent: Dec. 10, 2019

(54) THERMOPLASTIC RESIN COMPOSITION AND MOLDED ARTICLE USING THE SAME

(71) Applicant: Lotte Advanced Materials Co., Ltd., Yeosu-si (KR)

(72) Inventors: Jungeun Park, Uiwang-si (KR); Heeyun Jeong, Uiwang-si (KR); Keehae Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 25 days.

(21) Appl. No.: 15/856,188

(22) Filed: Dec. 28, 2017

(65) Prior Publication Data

US 2018/0186999 A1    Jul. 5, 2018

(30) Foreign Application Priority Data

Dec. 30, 2016 (KR) .................. 10-2016-0184151

(51) Int. Cl.
| | | |
|---|---|---|
| *C08L 67/02* | (2006.01) | |
| *C08K 3/36* | (2006.01) | |
| *C08K 3/22* | (2006.01) | |
| *C08K 3/40* | (2006.01) | |

(52) U.S. Cl.
CPC ........... *C08L 67/02* (2013.01); *C08L 2205/02* (2013.01); *C08L 2205/025* (2013.01); *C08L 2205/03* (2013.01); *C08L 2205/035* (2013.01)

(58) Field of Classification Search
CPC .................. C08L 67/02; C08L 2205/035
See application file for complete search history.

(56) References Cited

U.S. PATENT DOCUMENTS

| | | | | |
|---|---|---|---|---|
| 5,059,638 A | * | 10/1991 | Wissmann | ............... C08K 7/04 523/205 |
| 5,219,915 A | | 6/1993 | McKee et al. | |
| 5,840,798 A | | 11/1998 | Vollenberg et al. | |
| 8,969,465 B2 | | 3/2015 | Park et al. | |
| 2008/0167410 A1 | | 7/2008 | Shim et al. | |
| 2009/0054618 A1 | * | 2/2009 | Noda | .................... C08G 63/80 528/308.3 |
| 2010/0160529 A1 | | 6/2010 | Lee et al. | |
| 2011/0144239 A1 | | 6/2011 | Lee et al. | |
| 2014/0205785 A1 | | 7/2014 | Goshima et al. | |
| 2017/0095953 A1 | | 4/2017 | Munenobu et al. | |

FOREIGN PATENT DOCUMENTS

| | | |
|---|---|---|
| CN | 103881348 A | 6/2014 |
| DE | 102009054989 A1 | 6/2010 |
| EP | 2749597 A1 | 7/2014 |
| JP | 2000-273296 A | 10/2000 |
| JP | 2002-212400 A | 7/2002 |
| JP | 4104734 B2 | 6/2008 |
| JP | 2009-227750 A | 10/2009 |
| JP | 4657670 B2 | 3/2011 |
| JP | 5210068 B2 | 6/2013 |
| JP | 2016-183297 A | 10/2016 |
| KR | 10-2007-0070339 A | 7/2007 |
| KR | 10-0838321 B1 | 6/2008 |
| KR | 10-0885521 B1 | 2/2009 |
| KR | 10-2014-0092471 A | 7/2014 |
| KR | 10-2014-0081488 A | 3/2016 |
| WO | WO2013031541 A1 | 3/2015 |

OTHER PUBLICATIONS

Manual for ASTM D2857 by American Society for Testing and Materials, pp. 715-720 wiht a cover page, Downloaded on Apr. 12, 2019.*
Extended Search Report in counterpart European Application No. 17210185.9 dated May 2, 2018, pp. 1-6.
Office Action in counterpart Chinese Application No. 201711439189.4 dated Aug. 28, 2019, pp. 1-6.
English-translation of Office Action in counterpart Chinese Application No. 201711439189.4 dated Aug. 28, 2019, pp. 1-9.

* cited by examiner

*Primary Examiner* — Tae H Yoon
(74) *Attorney, Agent, or Firm* — Additon, Higgins & Pendleton, P.A.

(57) ABSTRACT

Disclosed are a thermoplastic resin composition including (A) a polyester resin, (B) a styrene-based copolymer, (C) a rubber modified vinyl-based graft copolymer, and (D) a glass fiber, wherein the polyester resin (A) includes (A-1) a polybutylene terephthalate resin having an intrinsic viscosity of less than or equal to about 1.1 dl/g and (A-2) a polyethylene terephthalate resin having an intrinsic viscosity of less than or equal to about 1.0 dl/g, and the glass fiber (D) includes (D-1) a first glass fiber having a length of about 2 mm to about 4 mm and (D-2) a second glass fiber having a length of about 10 μm to about 100 μm, and a molded article using the same.

8 Claims, No Drawings

THERMOPLASTIC RESIN COMPOSITION AND MOLDED ARTICLE USING THE SAME

CROSS-REFERENCE TO RELATED APPLICATION

This application claims priority to and the benefit of Korean Patent Application No. 10-2016-0184151 filed in the Korean Intellectual Property Office on Dec. 30, 2016, the entire disclosure of which is incorporated herein by reference.

FIELD

A thermoplastic resin composition and a molded article using the same are disclosed.

BACKGROUND

Thermoplastic resins can have improved properties such as lower specific gravity than glass or metal and improved formability, impact resistance, and the like. Recently, thermoplastic resins have been used to manufacture plastic products, as various products such as electric/electronic products have become less expensive and become larger and lighter, and the plastic products have rapidly replaced conventional glass or metal products and been widely used from electric/electronic products to auto parts.

With regard to auto parts, there has been a demand for an unpainted material that is light weight to save energy and also environmentally-friendly. Accordingly, a product manufactured by reinforcing a crystalline resin for example polypropylene with a filler has been developed. Although a filled polypropylene material can be inexpensive and low weight, there can be problems associated with the same. For example, the paint can deteriorate and/or delaminate, resulting in defects and requiring additional processing steps. As another example, a nylon material has a high moisture absorption rate and thus may cause a large dimension change of a product depending on temperature and humidity, which can result in a high defect rate.

Accordingly, there is a need for a thermoplastic resin composition having excellent dimensional stability as well as a good appearance, high impact resistance, and a high strength appropriate for an exterior material capable, for example, of replacing a metal in an automobile.

SUMMARY OF THE INVENTION

A thermoplastic resin composition that can have improved impact resistance, dimensional stability, and appearance and a molded article using the same are provided.

In an embodiment of the present disclosure, a thermoplastic resin composition includes (A) a polyester resin, (B) a styrene-based copolymer, (C) a rubber modified vinyl-based graft copolymer, and (D) a glass fiber. The polyester resin (A) includes (A-1) a polybutylene terephthalate resin having an intrinsic viscosity of less than or equal to about 1.1 dl/g and (A-2) a polyethylene terephthalate resin having an intrinsic viscosity of less than or equal to about 1.0 dl/g and the glass fiber (D) includes (D-1) a first glass fiber having a length of about 2 mm to about 4 mm and (D-2) a second glass fiber having a length of about 10 μm to about 100 μm.

A weight average molecular weight of the polyester resin (A) may be about 10,000 to about 80,000 g/mol.

The polybutylene terephthalate resin (A-1) having an intrinsic viscosity of less than or equal to about 1.1 dl/g and the polyethylene terephthalate resin (A-2) having an intrinsic viscosity of less than or equal to about 1.0 dl/g may be included in a weight ratio of about 1:1 to about 2:1.

The glass fiber (D) may include the first glass fiber (D-1) and the second glass fiber (D-2) in a weight ratio of about 1:1 to about 3:1.

The thermoplastic resin composition may further include an inorganic filler.

The inorganic filler may include alumina, amorphous silica, anhydrous aluminum silicate, mica, feldspar, clay, talc, a glass flake, a glass microsphere, wollastonite, a titanium dioxide, a zinc oxide or a combination thereof.

The thermoplastic resin composition may include about 50 wt % to about 70 wt % of the (A) polyester resin, about 5 wt % to about 15 wt % of the (B) styrene-based copolymer, about 5 wt % to about 15 wt % of the (C) rubber modified vinyl-based graft copolymer, and about 15 wt % to about 25 wt % of the (D) glass fiber based on a total amount (total weight, 100 wt %) of the thermoplastic resin composition.

In another embodiment of the present disclosure, a molded article manufactured using the thermoplastic resin composition is provided.

A thermoplastic resin composition according to an embodiment of the present disclosure and a molded article using the same can have improved impact resistance, dimensional stability, and/or appearance.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

In an embodiment of the present disclosure, a thermoplastic resin composition includes (A) a polyester resin, (B) a styrene-based copolymer, (C) a rubber modified vinyl-based graft copolymer, and (D) a glass fiber.

The polyester resin (A) includes (A-1) a polybutylene terephthalate resin having an intrinsic viscosity of less than or equal to about 1.1 dl/g and (A-2) a polyethylene terephthalate resin having an intrinsic viscosity of less than or equal to about 1.0 dl/g.

In addition, the glass fiber (D) includes (D-1) a first glass fiber having a length of about 2 mm to about 4 mm and (D-2) a second glass fiber having a length of about 10 μm to about 100 μm.

The thermoplastic resin composition may have improved impact resistance, dimensional stability and/or appearance characteristics.

The thermoplastic resin composition may include about 50 wt % to about 70 wt % of the (A) polyester resin, about 5 wt % to about 15 wt % of the (B) styrene-based copolymer, about 5 wt % to about 15 wt % of the (C) rubber modified vinyl-based graft copolymer, and about 15 wt % to about 25 wt % of the (D) glass fiber based on a total amount (total weight, 100 wt %) of the thermoplastic resin composition.

Hereinafter, each component of the thermoplastic resin composition is described in detail.

(A) Polyester Resin

The polyester resin includes (A-1) a polybutylene terephthalate (PBT) resin having an intrinsic viscosity [η] of less than or equal to about 1.1 dl/g measured according to ASTM D2857 and (A-2) a polyethylene terephthalate resin having an intrinsic viscosity [η] of less than or equal to about 1.0 dl/g measured according to ASTM D2857.

When the intrinsic viscosity of the polybutylene terephthalate resin is greater than about 1.1 dl/g, a thermoplastic resin composition including the same and a molded article using the same may exhibit deteriorated appearance.

A weight average molecular weight of the polyester resin (A) may range from about 10,000 g/mol to about 80,000 g/mol, for example about 15,000 g/mol to about 75,000 g/mol. When the weight average molecular weight of the polyester resin satisfies the above ranges, improved appearance characteristics after reinforcing the glass fiber may be realized.

The polybutylene terephthalate resin (A-1) having an intrinsic viscosity of less than or equal to about 1.1 dl/g and the polyethylene terephthalate resin (A-2) having an intrinsic viscosity of less than or equal to about 1.0 dl/g may be included in a weight ratio of about 1:1 to about 2:1. When the polybutylene terephthalate resin (A-1) having an intrinsic viscosity of less than or equal to about 1.1 dl/g and the polyethylene terephthalate resin (A-2) having an intrinsic viscosity of less than or equal to about 1.0 dl/g are included in a weight ratio of 1:1 to 2:1, appearance characteristics, dimensional stability, and/or impact resistance may be improved.

The polybutylene terephthalate resin refers to both of a polybutylene terephthalate polymer and a polybutylene terephthalate copolymer.

The polybutylene terephthalate resin may include a polybutylene terephthalate polymer condensation-polymerized by directly esterifying and/or ester-exchanging terephthalic acid and/or dimethyl terephthalate with 1,4-butanediol.

A polybutylene terephthalate copolymer can be obtained by copolymerizing and/or mixing the polybutylene terephthalate polymer with one or more of an impact-improving component such as polytetramethylene glycol (PTMG), polyethylene glycol (PEG), polypropylene glycol (PPG), aliphatic polyester, aliphatic polyamide, and the like to improve impact strength of the resin and/or modify the surface thereof.

The polyester resin may be included in an amount of about 50 wt % to about 70 wt % the based on a total amount (total weight, 100 wt %) of the thermoplastic resin composition. In some embodiments, the thermoplastic resin composition may include the polyester resin in an amount of about 50, 51, 52, 53, 54, 55, 56, 57, 58, 59, 60, 61, 62, 63, 64, 65, 66, 67, 68, 69, or 70 wt %. Further, according to some embodiments, the amount of the polyester resin may be in a range from about any of the foregoing amounts to about any other of the foregoing amounts. When the polyester resin is included in an amount within the above ranges, heat resistance and/or appearance characteristics may be improved.

(B) Styrene-Based Copolymer

The styrene-based copolymer may be a copolymer of a styrene-based monomer and a vinyl cyanide monomer.

Examples of the styrene-based monomer may include without limitation styrene; divinyl benzene; vinyl toluene; alkyl substituted styrene such as α-methyl styrene, p-t-butyl styrene, 2,4-dimethyl styrene, and the like; halogen substituted styrene; and the like, and combinations thereof. As used herein, the alkyl may be C1 to C8 alkyl.

Examples of the vinyl cyanide monomer may include without limitation acrylonitrile, methacrylonitrile, fumaronitrile, and the like, and combinations thereof.

The copolymer of the styrene-based monomer and vinyl cyanide monomer may be prepared by an emulsion polymerization method, a suspension polymerization method, a solution polymerization method, a massive polymerization method, and the like.

A content of the vinyl cyanide monomer may be about 10 wt % to about 40 wt % and a content of the styrene-based monomer may be about 60 wt % to about 90 wt % based on 100 wt % of the copolymer of the vinyl cyanide monomer and the styrene-based monomer.

In some embodiments, the styrene-based copolymer may include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the vinyl cyanide monomer may be in a range from about any of the foregoing amounts to about any other of the foregoing amounts.

In some embodiments, the styrene-based copolymer may include the styrene-based monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the styrene-based monomer may be in a range from about any of the foregoing amounts to about any other of the foregoing amounts.

When the contents of the vinyl cyanide monomer and the styrene-based monomer are within the above ranges, the thermoplastic resin composition including the same may have excellent impact resistance, fluidity, heat resistance, hardness, and the like.

A weight average molecular weight of the styrene-based copolymer is not particularly limited and may be about 40,000 g/mol to about 500,000 g/mol.

A content of the styrene-based copolymer may be about 5 wt % to about 15 wt % based on 100 wt % (a total amount) of the thermoplastic resin composition. In some embodiments, the thermoplastic resin composition may include the styrene-based copolymer in an amount of about 5, 6, 7, 8, 9, 10, 11, 12, 13, 14, or 15 wt %. Further, according to some embodiments, the amount of the styrene-based copolymer may be in a range from about any of the foregoing amounts to about any other of the foregoing amounts. When the styrene-based copolymer is present in an amount within the above range, appearance, dimensional stability, and/or impact resistance can be improved.

(C) Rubber Modified Vinyl-Based Graft Copolymer

The rubber modified vinyl-based graft copolymer is a copolymer including about 5 wt % to about 95 wt % of a vinyl-based copolymer grafted on about 5 wt % to about 95 wt % of a rubbery polymer.

In some embodiments, the rubber modified vinyl-based graft copolymer may include the vinyl-based copolymer in an amount of about 5, 6, 7, 8, 9, 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the vinyl-based copolymer may be in a range from about any of the foregoing amounts to about any other of the foregoing amounts.

In some embodiments, the rubber modified vinyl-based graft copolymer may include the rubbery polymer in an amount of about 5, 6, 7, 8, 9, 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the rubbery polymer may be in a range from about any of the foregoing amounts to about any other of the foregoing amounts.

The vinyl-based copolymer may be a polymer consisting of about 50 to about 95 wt % of a first vinyl-based monomer including an aromatic vinyl monomer, an acryl-based monomer, a heterocyclic monomer, or a combination thereof; and about 5 to about 50 wt % of a second vinyl-based monomer including a vinyl cyanide monomer, a heterogeneous acryl-based monomer different from the acryl-based monomer, a heterogeneous heterocyclic monomer different from the heterocyclic monomer, or a combination thereof. Herein, the term "heterogeneous" refers to different kinds from each other.

In some embodiments, the vinyl-based copolymer may include the first vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the first vinyl-based monomer may be in a range from about any of the foregoing amounts to about any other of the foregoing amounts.

In some embodiments, the vinyl-based copolymer may include the second vinyl-based monomer in an amount of about 5, 6, 7, 8, 9, 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the second vinyl-based monomer may be in a range from about any of the foregoing amounts to about any other of the foregoing amounts.

Examples of the aromatic vinyl monomer may include without limitation styrene, C1 to C10 alkyl substituted styrene, halogen substituted styrene, and the like, and combinations thereof. Examples of the alkyl substituted styrene may include without limitation o-ethyl styrene, m-ethyl styrene, p-ethyl styrene, α-methyl styrene, and the like, and combinations thereof.

The acryl-based monomer may be (meth)acrylic acid alkyl ester, (meth)acrylic acid ester, or a combination thereof. Herein, the alkyl may refer to C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof. For example, methyl(meth)acrylate may be used.

Examples of the heterocyclic monomer may include without limitation maleic anhydride, C1-C10 alkyl and/or phenyl N-substituted maleimide, and the like, and combinations thereof.

Examples of the vinyl cyanide monomer may include without limitationacrylonitrile, methacrylonitrile, fumaronitrile, and the Ike, and combinations thereof.

Examples of the rubbery polymer may include without limitation a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, and the like, and combinations thereof.

A particle diameter of the rubbery polymer particle during the preparation of the rubber modified vinyl-based graft copolymer may be about 0.05 μm to about 4 μm so as to improve impact resistance and/or surface characteristics of molded articles. The average particle diameter of the rubbery polymer can be measured using conventional techniques known in the art, such as a photographic length of the subject particle obtained by a transmission electron microscope (TEM), and averaged from 100 subject particles. Methods for measuring average particle diameter using TEM are well known in the art and the meaning of the average particle diameter is understood by the skilled artisan.

The rubber modified vinyl-based graft copolymer may be used alone or in a mixture of two or more kinds.

Examples of the rubber modified vinyl-based graft copolymer may include without limitation a monomer mixture of styrene, acrylonitrile, and optionally methyl(meth)acrylate which is graft-copolymerized on a butadiene rubber, an acrylic rubber, and/or a styrene/butadiene rubber.

Another example of the rubber modified vinyl-based graft copolymer may include methyl(meth)acrylate which is graft-copolymerized on a butadiene rubber, an acrylic rubber, and/or a styrene/butadiene rubber.

Another example of the rubber modified graft copolymer may include an acrylonitrile-butadiene-styrene graft copolymer (g-ABS).

A method of preparing the rubber modified vinyl-based graft copolymer is well-known by a person having an ordinary skill in this art, and may include without limitation emulsion polymerization, suspension polymerization, solution polymerization and/or mass polymerization. For example, a emulsion polymerization and/or mass polymerization may used by adding the vinyl-based monomer and using a polymerization initiator in the presence of a rubbery polymer.

The rubber modified vinyl-based graft copolymer may be included in an amount of about 5 wt % to about 15 wt %, for example about 7 wt % to about 12 wt %, based on 100 wt % (total amount) of the thermoplastic resin composition. In some embodiments, the thermoplastic resin composition may include the rubber modified vinyl-based graft copolymer in an amount of about 5, 6, 7, 8, 9, 10, 11, 12, 13, 14, or 15 wt %. Further, according to some embodiments, the amount of the rubber modified vinyl-based graft copolymer may be in a range from about any of the foregoing amounts to about any other of the foregoing amounts. In this case, the thermoplastic resin composition can have improved mechanical strength, impact strength and/or heat resistance.

(D) Glass Fiber

The glass fiber includes (D-1) a first glass fiber having a length (the longest diameter) of about 2 mm to about 4 mm and (D-2) a second glass fiber having a length (the longest diameter) of about 10 μm to about 100 μm. The glass fiber may improve impact resistance, heat resistance, and/or dimensional stability and simultaneously secure excellent appearance characteristics when added to the thermoplastic resin composition.

The first glass fiber (D-1) may include a generally-used glass fiber in an art related to the present disclosure.

The first glass fiber (D-1) may improve impact resistance and/or dimensional stability of the thermoplastic resin composition and the molded article using the same.

The second glass fiber (D-2) may be prepared by grinding the first glass fiber (D-1). In other words, the second glass fiber (D-2) may be a milled glass fiber.

The second glass fiber (D-2) may improve appearance characteristics of the thermoplastic resin composition and the molded article using the same.

The thermoplastic resin composition may realize excellent appearance characteristics due to the second glass fiber (D-2) and also can exhibit improved impact strength and/or dimensional stability due to the first glass fiber (D-1). In other words, the present disclosure uses a mixture of the two kinds of glass fibers, which may improve impact resistance and dimensional stability and simultaneously, secure excellent appearance characteristics.

A content (weight) ratio of the first glass fiber (D-1) and the second glass fiber (D-2) may be a weight ratio of about 1:1 to about 3:1. In some embodiments, the first glass fiber (D-1) and the second glass fiber (D-2) may be present in a weight ratio of about 1:1, 2:1 or 3:1. When the first glass fiber (D-1) and the second glass fiber (D-2) are present in a weight ratio in the above range, impact resistance and/or dimensional stability may not only sufficiently be improved, but appearance characteristics may also be improved.

The glass fiber may be treated with a predetermined glass fiber treatment agent in order to improve adherence to the polyester resin. The glass fiber may be treated during a manufacturing process of a fiber or a post-formation process. The glass fiber treatment agent may be any one or more of a lubricant, a coupling agent, a surfactant, and the like. The lubricant is used to form a strand having a uniform diameter and thickness during manufacture of a glass fiber, and the coupling agent plays a role of providing good adherence between the glass fiber and the resin. The above various glass fiber treatment agents may be appropriately selected depending on the types of resin and glass fiber and can provide good properties to a material including the glass fiber.

The glass fiber (D) may be present in an amount of about 15 wt % to 25 wt % based on 100 wt % (total amount) of the thermoplastic resin composition. In some embodiments, the thermoplastic resin composition may include the glass fiber in an amount of about 15, 16, 17, 18, 19, 20, 21, 22, 23, 24, or 25 wt %. Further, according to some embodiments, the amount of the glass fiber may be in a range from about any of the foregoing amounts to about any other of the foregoing amounts.

When the glass fiber is included in an amount within the above range, the thermoplastic resin composition and a molded article using the same may have excellent impact resistance, dimensional stability, and/or appearance characteristics.

(E) Other Additives

The thermoplastic resin composition may further include one or more kinds of other additives in order to balance properties, as needed depending on the end product. Examples of the other additives may include without limitation flame retardants, surfactants, nucleating agents, coupling agents, plasticizers, slipping agents, antibacterial agents, release agents, antioxidants, metal oxides, colorants, lubricants, antistatic agents, pigments, dyes, flame-proofing agents, heat stabilizers, ultraviolet (UV) absorbers, ultraviolet (UV) blocking agents, nucleus-forming agents, adhesives, and the like, and may be used alone or in a combination of two or more.

For example, the thermoplastic resin composition may further include an inorganic filler that is different from the glass fiber described herein.

Examples of the inorganic filler may include without limitation alumina, amorphous silica, anhydrous aluminum silicate, mica, feldspar, clay, talc, a glass flake, a glass microsphere, wollastonite, a titanium dioxide, a zinc oxide, and the like, and combinations thereof.

The other additives, for example inorganic fillers may be appropriately included within an amount that does not effect properties of the thermoplastic resin composition, for example, in an amount of about 0.1 parts by weight to about 10 parts by weight based on about 100 parts by weight of the thermoplastic resin composition.

The thermoplastic resin composition may be manufactured using a known method. For example, the components according to one embodiment and other optional additives can be simultaneously mixed, and the mixture can be melt-extruded in an extruder and manufactured as a pellet.

In another embodiment of the present disclosure, a molded article using the thermoplastic resin composition is provided.

The molded article may be manufactured in various processes known in the art such as injection molding, blow molding, extrusion molding, thermal molding, and the like by using thermoplastic resin composition.

The molded article may exhibit improved weather resistance as well as excellent impact resistance, mechanical strength, and/or heat resistance and may be advantageously applied to various outdoor electronic parts, building materials, sport goods, auto parts, and the like. For example, the molded article can have excellent heat resistance, dimensional stability, and/or appearance and may be used for a roof material for an auto.

Hereinafter, the present disclosure is illustrated in more detail with reference to the following examples and comparative examples. However, the following examples and comparative examples are provided for the purpose of illustration only and the present disclosure is not limited thereto.

Examples 1 to 3 and Comparative Examples 1 to 7

The components are mixed in the amounts shown in Table 1 and then extruded and processed to form pellets using a twin-screw extruder having L/D=29 and a diameter of 45 mm and setting a Barrel temperature at 230° C.

TABLE 1

(unit: wt %)

|   |   | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|
| (A) | (A-1) | 30 | 25 | 35 | 60 | 35 | 30 | 30 | — | 20 | 40 |
|  | (A'-1) | — | — | — | — | — | — | — | 30 | — | — |
|  | (A-2) | 30 | 25 | 35 | — | 35 | 30 | 30 | 30 | 20 | 40 |
| (B) |  | 10 | 15 | 5 | 10 | — | 10 | 20 | 10 | 15 | 5 |

TABLE 1-continued (unit: wt %)

|  |  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|
| (C) |  | 10 | 15 | 5 | 10 | 10 | 10 | — | 10 | 15 | 5 |
| (D) | (D-1) | 10 | 10 | 10 | 10 | 10 | 20 | 10 | 10 | 15 | 5 |
|  | (D-2) | 10 | 10 | 10 | 10 | 10 | — | 10 | 10 | 15 | 5 |

Each component in Table 1 is described as follows.

(A-1) polybutylene terephthalate resin (intrinsic viscosity: 0.83 dl/g, Shinkong Corp., K001)

(4) Impact Resistance: Izod Impact strength is measured according to ASTM D256 (specimen thickness: 1/8", notched).

TABLE 2

|  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Anisotropy | 1.04 | 1.00 | 1.08 | 1.20 | 1.20 | 1.20 | 1.00 | 1.04 | 1.0 | 1.4 |
| Appearance | Good | Good | Good | Inferior | Good | Inferior | Good | Inferior | Inferior | Good |
| Flexural strength (kgf/cm$^2$) | 51,000 | 50,000 | 60,000 | 52,000 | 55,000 | 50,000 | 50,000 | 51,000 | 65,000 | 30,000 |
| Izod Impact strength (kgf · cm/cm) | 7.0 | 7.0 | 7.0 | 8.0 | 8.0 | 8.5 | 4.5 | 7.0 | 7.0 | 5 |

(A'-1) polybutylene terephthalate resin (intrinsic viscosity: 1.20 dl/g, Shinkong Corp., DHK011)

(A-2) polyethylene terephthalate resin (intrinsic viscosity: 0.80 dl/g, Lotte Chemical Corporation, BCN76)

(B) styrene-acrylonitrile copolymer (SAN resin including an acrylonitrile content of 20 wt % and having a weight average molecular weight of 120,000 g/mol)

(C) acrylonitrile-butadiene-styrene graft copolymer (g-ABS) having a core-shell shape wherein a styrene-acrylonitrile copolymer as a shell layer is graft-polymerized on a butadiene rubber core having an average particle diameter of 0.27 μm.

(D-1) glass fiber having an average length of 3 mm (Nittobo Boseki Co., Ltd., ECS 03T-187H)

(D-2) milled glass fiber having an average length of 75 μm (Central Glass fiber Co. Ltd., EFH 75-01)

Experimental Examples

Specimens for measuring properties are manufactured by drying the pellets formed according to Table 1 at 100° C. for 2 hours and then processing the pellets by setting a cylinder temperature at 260° C. and a mold temperature at 60° C. in a 150 ton injection molding machine. Properties of the specimens are measured using the following methods, and the results are shown in Table 2.

(1) Dimensional Stability: Anisotropy is measured by measuring a shrinkage according to ASTM D955 and then, measuring a resin flow direction (MD) and an opposite resin flow direction (TD) and calculating a TD/MD.

(2) Appearance Characteristics: evaluated by observing a 9 cm×5 cm×0.2 cm injection specimen with the naked eye and rating the appearance.

Evaluation Reference for Appearance Characteristics

Good: A smooth appearance of a specimen when examined with the naked eye

Inferior: A protruded appearance of a specimen when examined with the naked eye (3) Hardness: Flexural strength is measured according to ASTM D790.

Referring to Table 2, when a polyester resin is included in an amount of 50 wt % to 70 wt % based on a total amount of the thermoplastic resin composition, dimensional stability, appearance characteristics, and impact resistance are all excellent. In addition, when a polybutylene terephthalate resin having intrinsic viscosity of greater than 1.1 dl/g is used, appearance characteristics are deteriorated.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
about 50 wt % to about 70 wt % of (A) a polyester resin comprising (A-1) a polybutylene terephthalate resin having an intrinsic viscosity of less than or equal to about 1.1 dl/g as measured according to ASTM D2857 and (A-2) a polyethylene terephthalate resin having an intrinsic viscosity of less than or equal to about 1.0 dl/g as measured according to ASTM D2857, wherein the polybutylene terephthalate resin (A-1) having an intrinsic viscosity of less than or equal to about 1.1 dl/g and the polyethylene terephthalate resin (A-2) having an intrinsic viscosity of less than or equal to about 1.0 dl/g are present in a weight ratio of about 1:1 to about 2:1,
about 5 wt % to about 15 wt % of (B) a styrene-based copolymer,
about 5 wt % to about 15 wt % of (C) a rubber modified vinyl-based graft copolymer, and
about 5 wt % to about 25 wt % of (D) a glass fiber comprising (D-1) a first glass fiber having a length of about 2 mm to about 4 mm and (D-2) a second glass fiber having a length of about 10 μm to about 100 μm.

2. The thermoplastic resin composition of claim 1, wherein the polyester resin (A) has a weight average molecular weight of about 10,000 to about 80,000 g/mol.

3. The thermoplastic resin composition of claim 1, wherein the glass fiber (D) includes the first glass fiber (D-1) and the second glass fiber (D-2) in a weight ratio of about 1:1 to about 3:1.

4. The thermoplastic resin composition of claim 1, wherein the thermoplastic resin composition further includes an inorganic filler.

5. The thermoplastic resin composition of claim 4, wherein the inorganic filler includes alumina, amorphous silica, anhydrous aluminum silicate, mica, feldspar, clay, talc, a glass flake, a glass microsphere, wollastonite, a titanium dioxide, a zinc oxide or a combination thereof.

6. A molded article using the thermoplastic resin composition of claim 1.

7. The thermoplastic resin composition of claim 1, comprising about 5 wt % to about 20 wt % of (D) the glass fiber comprising (D-1) the first glass fiber having a length of about 2 mm to about 4 mm and (D-2) the second glass fiber having a length of about 10 μm to about 100 μm.

8. The thermoplastic resin composition of claim 1, wherein (D) the glass fiber is selected from the group consisting of both (D-1) the first glass fiber having a length of about 2 mm to about 4 mm and (D-2) the second glass fiber having a length of about 10 μm to about 100 μm.

* * * * *